(12) United States Patent
Curtis

(10) Patent No.: US 8,893,663 B2
(45) Date of Patent: Nov. 25, 2014

(54) HIND-END SUPPORT APPARATUS FOR DOGS

(76) Inventor: Terrie J Curtis, Danvers, MA (US)

(*) Notice: Subject to any disclaimer, the term of this patent is extended or adjusted under 35 U.S.C. 154(b) by 466 days.

(21) Appl. No.: 13/355,411

(22) Filed: Jan. 20, 2012

(65) Prior Publication Data

US 2012/0186537 A1 Jul. 26, 2012

Related U.S. Application Data

(60) Provisional application No. 61/434,799, filed on Jan. 20, 2011.

(51) Int. Cl.
| | | |
|---|---|---|
| *A01K 15/04* | (2006.01) | |
| *A61D 3/00* | (2006.01) | |
| *A01K 27/00* | (2006.01) | |
| *A61D 9/00* | (2006.01) | |

(52) U.S. Cl.
CPC ................ *A01K 27/002* (2013.01); *A61D 9/00* (2013.01)
USPC ............................ 119/725; 119/728; 119/856

(58) Field of Classification Search
USPC ......... 119/725, 726, 728, 792, 793, 856, 756; D29/101.1, 101.3, 101.4, 101.5; 54/24, 54/18.1, 18.2, 18.3
See application file for complete search history.

(56) References Cited

U.S. PATENT DOCUMENTS

| | | | | |
|---|---|---|---|---|
| 5,511,515 | A * | 4/1996 | Brown et al. | 119/771 |
| 6,123,049 | A * | 9/2000 | Slater | 119/850 |
| 6,161,505 | A * | 12/2000 | Noguero | 119/792 |
| 6,694,921 | B2 * | 2/2004 | Emerick | 119/725 |
| 7,165,511 | B1 * | 1/2007 | Brezinski | 119/792 |
| 8,459,210 | B2 * | 6/2013 | Cho | 119/792 |
| 2003/0066494 | A1 * | 4/2003 | Hippensteel | 119/792 |
| 2005/0263101 | A1 * | 12/2005 | Jenny et al. | 119/792 |
| 2007/0044735 | A1 * | 3/2007 | Zimmerman | 119/856 |
| 2007/0113798 | A1 * | 5/2007 | Torjesen | 119/725 |
| 2008/0276880 | A1 * | 11/2008 | Swisher et al. | 119/728 |
| 2012/0298051 | A1 * | 11/2012 | Cho | 119/792 |
| 2012/0304943 | A1 * | 12/2012 | Meisenbach | 119/856 |

* cited by examiner

*Primary Examiner* — Monica Williams
*Assistant Examiner* — Michael A Fabula

(57) ABSTRACT

A hind-end support system for dogs with hind-end disabilities. The system comprises a handle strap, an under belly support, a back strap, and a left leg strap and a right leg strap. The handle strap is utilized to pull the lower abdomen and the hind legs of the dog upward so the hind-end of the dog can be lifted up and/or carried forward by the owner. The lower abdomen of the dog is supported by the under belly support, whereas the left hind leg and the right hind leg of the dog are strapped and supported by the left leg and the right leg straps, respectively. The back strap is utilized to connect the handle strap to the under belly support and the leg straps. Lengths of the straps are all made adjustable via attachment means such as buckling mechanisms, D-rings, swivel lobster clasps and tri-glide slides.

3 Claims, 5 Drawing Sheets

HIND-END SUPPORT APPARATUS FOR DOGS

The current application claims a priority to the U.S. Provisional Patent application Ser. No. 61/434,799 filed on Jan. 20, 2011.

FIELD OF THE INVENTION

The present invention is a support apparatus for dogs with hind-end disabilities. The preferred embodiment of the present invention is intended for but not limited to dogs.

BACKGROUND OF THE INVENTION

The hind-end support apparatus is a dog harness that assists dogs with hind-end disabilities. This hind-end support apparatus enables dogs to get the exercise needed and enjoyed when they have temporary or permanent back leg injuries. It helps reduce weight on the back legs and hips. For older dogs who have reduced strength, hip dysplasia, arthritis, weak musclesor other disabilities in their hind end, this hind-end support apparatus enables them to get the walk they need. Exercise is very important for heart and lung health especially in older dogs. The hind-end support apparatus gently supports the dog's back end and allows the dog for longer walks and healthier living. This present invention is suitable for dogs after surgery especially for those who have torn ligaments or similar injuries in their hind leg. The hind-end support apparatus allows for gentle guided exercise during healing. It is very useful in helping both the dog and owner during the delicate healing process when bearing weight is very limited.

The hind-end support apparatus is also suitable for dogs with only one back leg. The design allows for the removal of the extra leg strap while still remaining secure and completely functional to assist your dog. The hind-end support apparatus is also designed so it can be attached and left on the dog. This is especially helpful for older dogs that have difficulty getting up from the floor.

DETAIL DESCRIPTIONS OF THE INVENTION

All illustrations of the drawings are for the purpose of describing selected versions of the present invention and are not intended to limit the scope of the present invention.

Figure 1:
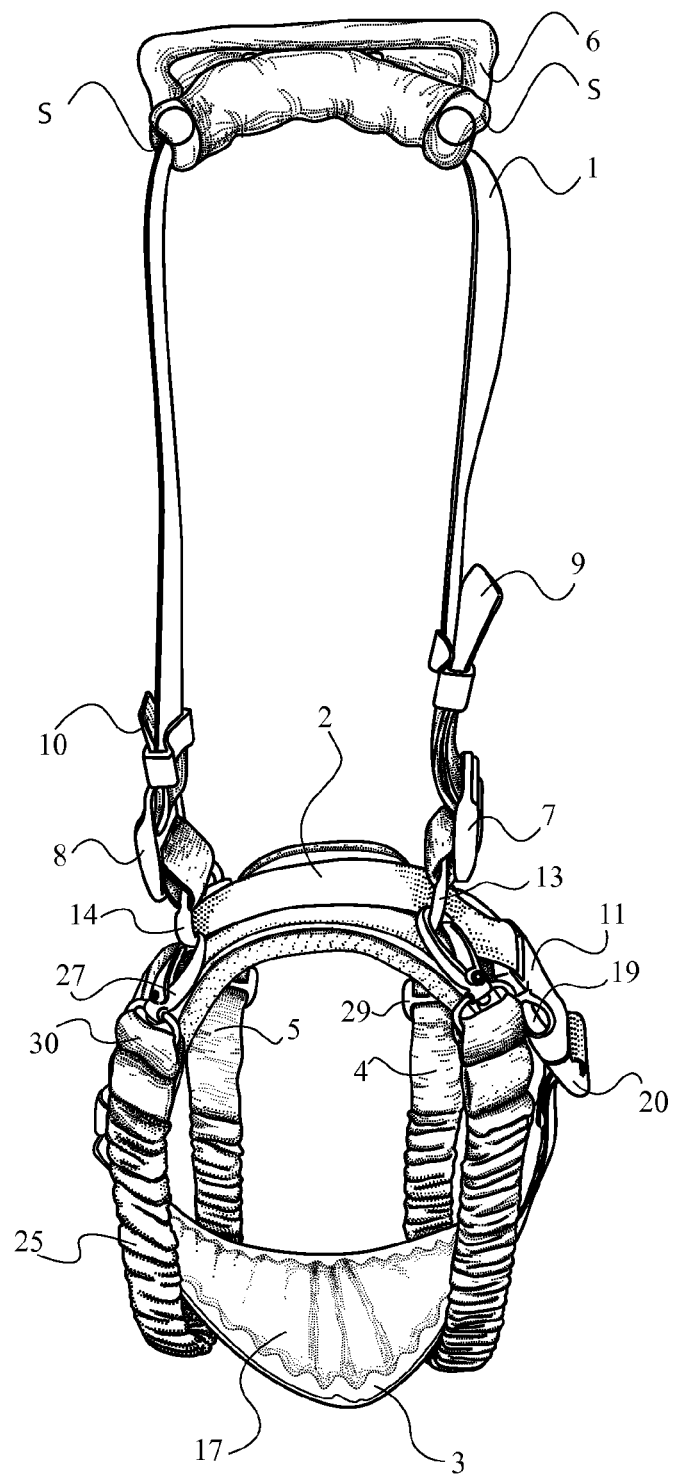
FIG. 1 is a front view of the present invention.
Figure 2:
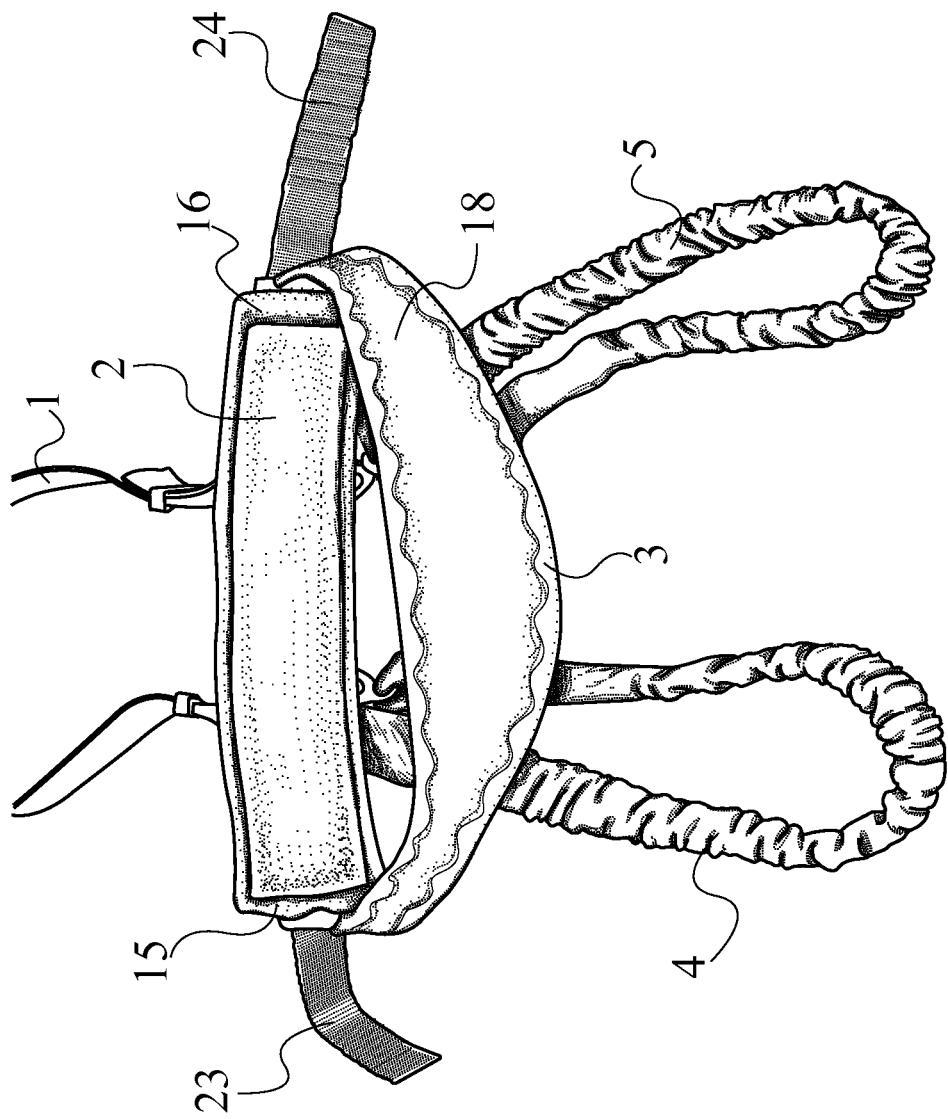
FIG. 2 is a bottom view of the present invention.
Figure 5:
FIG. 5 is a perspective view of the present invention being used by the owner to support the dog's hind legs.

As can be seen in FIG. 1, the hind-end support apparatus is designed with a handle strap 1, an under belly support 3 running across the dog's lower abdomen, a left leg strap 4 and a right leg strap 5 for even weight distribution, a back strap 2 connecting the handle strap 1 to the under belly support 3 and the left leg strap 4 and right leg strap 5. With the under belly support 3 and the left leg strap 4 and right leg strap 5 in place, the hind-end of the dog is lifted up and carried forward when the owner pulls the handle strap 1 upward and carries the hind-end of the dog forward, which is shown in FIG. 5. In this manner, there is less weight on the injured leg of the dog. All the lengths of the straps are adjustable for proper fit, comfort, and stability. The length of the handle strap 1 has been made adjustable for proper height adjustment of the owner relative to that of the dog, so the owner will not need to bend over, risking injury. The design of the present invention ensures needed exercise for the dog with less chance of injury to the dog or the owner. The present invention also provides needed support for the disabled or injured dog to travel on slippery, icy, or hazardous surfaces. The present invention can be made stylish and colorful through customization and color coordinating of coverings of the straps.

Figure 4:
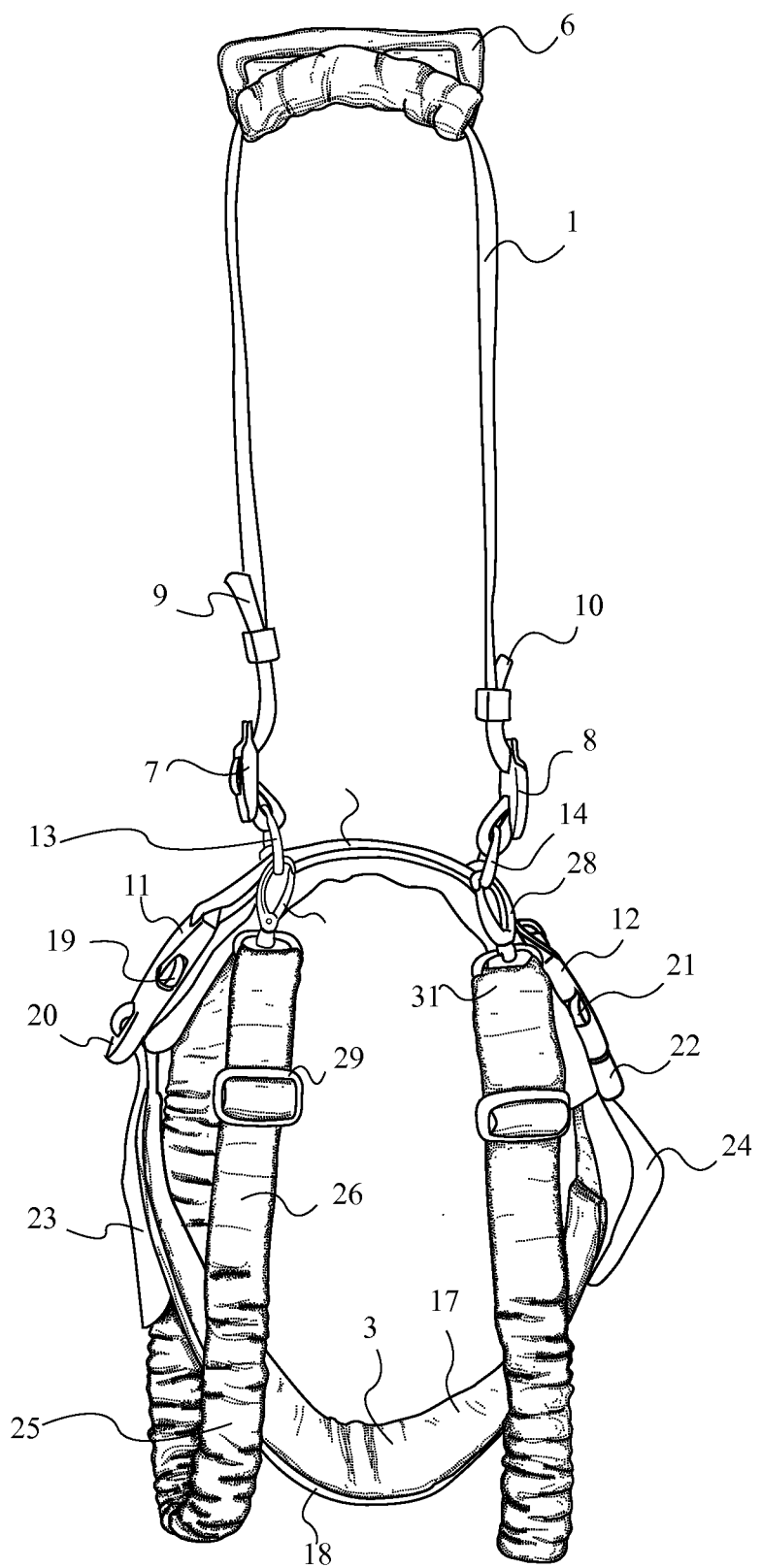
FIG. 4 is another front view of the present invention.

The handle strap 1 has a cushioned handle 6 situated at the center and in between the two ends of the handle strap 1, which is illustrated in FIG. 4. The cushioned handle 6 has a rectangular cross section with a hole concentrically traverses at the center and along the length of the cushioned handle 6. The hole allows the handle strap 1 to go through the cushioned handle 6. The hole, along with two snaps, allow the cushioned handle 6 to be easily removed from the handle strap 1 for customization, washing and maintenance. At the first handle end 9 of handle strap 1 is a first tri-glide slide 7, and at the second handle end 10 of the handle strap 1 is a second tri-glide slide 8. The first tri-glide slide 7 allows length adjustment of the handle strap 1 along the first handle end 9, whereas the second tri-glide slide 8 allows length adjustment of the handle strap 1 along the second handle end 10. The first handle end 9 and the second handle end 10 are attached to the back strap 2 via a left D-ring 13 and a right D-ring 14, respectively. The first handle end 9 loops through the left D-ring 14 of the back strap 2 and weaves through the first tri-glide slide 7, forming a closed loop. Similarly, the second handle end 10 loops through the right D-ring 14 of the back strap 2 and weaves through the second tri-glide slide 8, forming another closed loop. The length of the handle strap 1 has been made adjustable for ease of use in lifting and guiding the hind-end of the disabled dog for both the dog and the owner. The length is also made adjustable based on the heights of the owner and/or the dog. When the handle strap 1 is pulled upward, the lower abdomen of the dog is lifted via the under belly support 3 situated across the lower abdomen of the dog. The under belly support 3 is connected to the handle strap 1 via the back strap 2, which is located on the lower back of the dog.

The under belly support 3 is shown in FIG. 4 as a strap made of two materials. The cushion inner side 17 is made of soft fleece or flannel to situate against the lower abdomen of the dog. The aesthetic outer side 18 is made of fabric easily customizable for color coordinating. Each end of the under belly support 3 is a heavy duty webbing strap. A left belly end 23 of the under belly support 3 weaves through a left tri-glide slide 20 connected to a left male buckle 19. Similarly, a right belly end 24 of the under belly support 3 weaves through a right tri-glide slide 22 connected to a right male buckle 21. Through the attachment of the left belly end 23 to the left tri-glide slide 20, length of the left belly end 23 can be made adjustable. Similarly, through the attachment of the right belly end 24 to the right tri-glide slide 22, the length of the right belly end 24 has been made adjustable. The adjustment can be made by tightening or loosening the left belly end 23 to the left tri-glide slide 20. Similarly, the adjustment can be made by tightening or loosening the right belly end 24 to the right tri-glide slide 22. When in use, the left male buckle 19 loops around the left side of the lower abdomen and engages a left female buckle 11 of the back strap 2. Similarly, the right male buckle 21 loops around the right side of the lower abdomen and engages a right female buckle 12 of the back strap 2. Therefore, the under belly support 3 and the back strap 2 form a closed loop around the lower abdomen of the dog.

Figure 3:
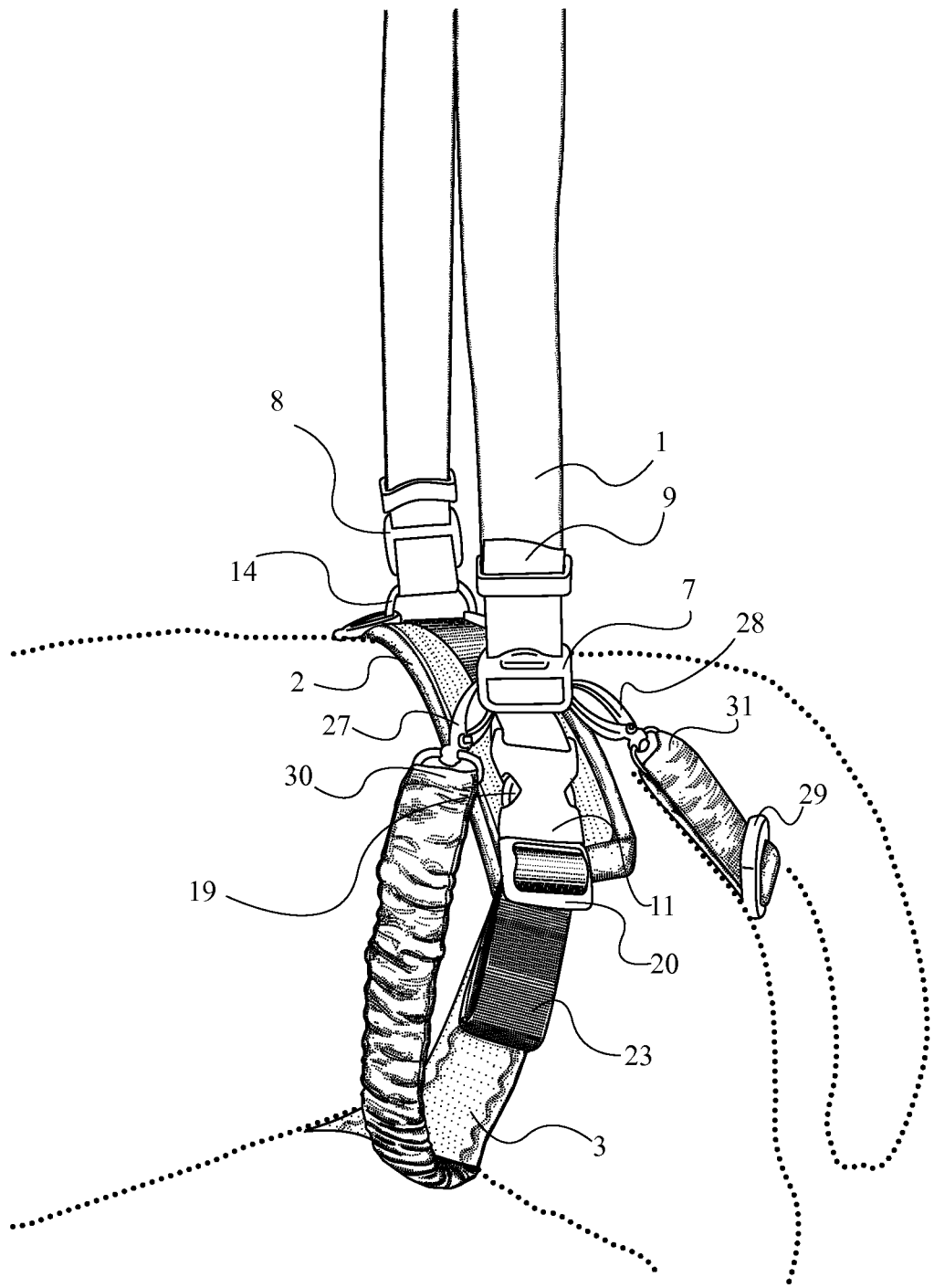
FIG. 3 is a perspective view of the present invention being attached to a dog's hind legs.

In FIG. 3, the back strap 2 is situated on the lower back of the dog when in use. The back strap 2 is made of heavy duty webbing that is encased with fleece and then topped with a color coordinating material. The back strap 2 has a first back end 15 and a second back end 16. At the first back end 15 is the left female buckle 11 and at the second back end 16 is the right female buckle 12. The left female buckle 11 is engaged to the left male buckle 19 of the under belly support 3. Similarly, the right female buckle 12 is engaged to the right male buckle 21 of the under belly support 3. Through these male and female buckling connection mechanisms, the under belly support 3 is securely connected to the back strap 2. Situated next to the left female buckle 11 and toward the left middle of the back strap 2 is the left D-ring 13. Similarly, situated next to the right female buckle 12 and toward right middle of the back strap 2 is the right D-ring 14. The left female buckle 11 and right female buckle 12 connect the back strap 2 to the under belly support 3, whereas the left D-ring 13 and the right D-ring 14 connect the back strap 2 to the handle strap 1 and the left leg strap 4 and the right leg strap 5, respectively. Additionally, the left D ring 13, the right D ring 14, the left female buckle 11, and the right female buckle 12 are attached to the back strap 2 via a second heavy duty webbing placed on top of the color coordinating material.

As can be seen in FIG. 4, the left leg strap 4 and right leg strap 5 each have an elastic portion 25, a covering 26, a leg tri-glide slide 29, a first swivel lobster clasp 27, a second swivel lobster clasp 28, a first leg end 30, and a second leg end 31. The elastic portion 25 is made of heavy duty non-roll elastic material. The first swivel lobster clasp 27 is connected to the first leg end 30 whereas the second swivel lobster clasp 28 is connected to the second leg end 31. The second swivel lobster clasp 28 is attached to the second leg end 31 via the leg tri-glide slide 29. The first swivel lobster clasp 27 of the left leg strap 4 is attached to the left D-ring 13, whereas the first swivel lobster clasp 27 of the right leg strap 5 is attached to the right D-ring 13. When in use, the second leg end 31 of the left leg strap 4 loops under the left hind leg and is attached back to the left D-ring 14 via the second swivel lobster clasp 28. Similarly, the second leg end 31 of right leg strap 5 loops under the right hind leg and is attached back to the right D-ring 14 via the second swivel lobster clasp 28. The left leg strap 4 and right leg strap 5 fasten around the left and right hind legs to help the owner carry the weight of the legs, whereas the under belly support 3 helps the owner carry the weight of the lower abdomen of the dog.

Although the invention has been explained in relation to its preferred embodiment, it is to be understood that many other possible modifications and variations can be made without departing from the spirit and scope of the invention as hereinafter claimed.

What is claimed is:

1. A hind-end support apparatus for dogs comprising:
   a handle strap;
   a back strap;
   an under belly support;
   a left leg strap;
   a right leg strap;
   wherein the handle strap comprises:
      a cushioned handle,
      a first tri-glide slide,
      a second tri-glide slide,
      a first handle end, and
      second handle end;
   wherein the cushioned handle comprises two snaps;
   wherein the back strap comprises:
      a left female buckle,
      a right female buckle,
      a left D-ring,
      a right D-ring,
      a first back end, and
      a second back end;
   wherein the under belly support comprises:
      a cushioned inner side,
      an aesthetic outer side,
      a left male buckle,
      a left tri-glide slide,
      a right male buckle,
      a right tri-glide slide,
      a left belly end, and
      a right belly end;
   wherein the left leg strap and the right leg strap each comprise:
      an elastic portion,
      a covering,
      a leg tri-glide slide,
      a first swivel lobster clasp,
      a second swivel lobster clasp,
      a first leg end, and
      a second leg end;
   wherein the first handle end of the handle strap is connected to the back strap via the left D-ring;
   wherein the second handle end of the handle strap is connected to the back strap via the right D-ring;
   wherein the handle strap has the cushioned handle situated between the first handle end and the second handle end;
   wherein the left male buckle of the under belly support is engaged to the left female buckle of the back strap;
   wherein the right male buckle of the under belly support is engaged to the right female buckle of the back strap;
   wherein the left tri-glide slide of the under belly support is connected adjacent to the left male buckle;
   wherein the right tri-glide slide of the under belly support is connected adjacent to the right male buckle;
   wherein the left end of the under belly support is connected to the left male buckle via the left tri-glide slide;
   wherein the right end of the under belly support is connected to the right male buckle via the right tri-glide;
   wherein the elastic portion of the leg strap is sheathed by the covering;
   wherein the first leg end and the second leg end of the left leg strap are positioned opposite to each other along the left leg strap;
   wherein the first leg end and the second leg end of the right leg strap are positioned opposite to each other along the right leg strap;
   wherein the first leg end of each leg strap loops through the first swivel lobster clasp;
   wherein the second leg end of each leg strap loops through the second swivel lobster clasp;
   wherein the second leg end of each leg strap weaves through the leg tri glide slide adjacent to the second swivel lobster clasp; and
   wherein each leg strap is releasably attached to the back strap.

2. The hind-end support apparatus as claimed in claim 1, wherein the first handle end of the handle strap loops through the left D-ring and fastens itself to the first tri-glide slide of the handle strap by weaving through the first tri-glide slide;

wherein the second handle end of the handle strap loops through the right D-ring and fastens itself to the second tri-glide slide of the handle strap by weaving through the second tri-glide slide;
wherein the left end of the under belly support is connected to the left tri-glide slide by weaving through the left tri-glide slide; and
wherein the right end of the under belly support is connected to the right tri-glide slide by weaving through the right tri-glide slide.

3. The hind-end support apparatus as claimed in claim 1,
wherein the left D-ring is positioned adjacent to the left female buckle of the back strap;
wherein the right D-ring is positioned adjacent to the right female buckle of the back strap;
wherein the left female buckle is positioned at the first back end of the back strap;
wherein the right female buckle is positioned at the right back end of the back strap;
wherein the left female buckle of the back strap is connected to the left male buckle of the under belly support;
wherein the right female buckle of the back strap is connected to the right male buckle of the under belly support;
wherein the first swivel lobster clasp of the left leg strap is attached to the left D-ring of the back strap;
wherein the second swivel lobster clasp of the left leg strap is attached to the left D-ring of the back strap;
wherein the first swivel lobster clasp of the right leg strap is attached to the right D-ring of the back strap; and
wherein the second swivel lobster clasp of the right leg strap is attached to the right D-ring of the back strap.

* * * * *